July 15, 1941. V. LINDSJO Re. 21,858

LOOM DOBBY

Original Filed Feb. 5, 1931 2 Sheets-Sheet 1

Inventor.
Verner Lindsjo
by Beard Smith & Tennant
Attys.

LOOM DOBBY

Original Filed Feb. 5, 1931 2 Sheets-Sheet 2

Inventor.
Verner Lindsjo
by Heard Smith & Tennant
Attys.

Reissued July 15, 1941 Re. 21,858

UNITED STATES PATENT OFFICE 21,858

LOOM DOBBY

Verner Lindsjo, Stockholm, Sweden, assignor to Draper Corporation, Hopedale, Mass., a corporation of Maine Original No. 1,853,985, dated April 12, 1932, Serial No. 513,589, February 5, 1931. Application for reissue February 8, 1941, Serial No. 378,786

6 Claims. (Cl. 139—66)

This invention relates to a loom dobby of that type in which the rocker arm for operating the dobby knives is operated by a crank motion.

The object of the invention is to provide a construction in this type of dobby which shall insure the same position for the crossing of the shed at all times.

The object of the invention more particularly is to secure in this type of dobby a construction in which the crossing of the shed shall take place at the same period in the cycle of a loom operation during both the upward movement and the downward movement of the dobby actuating crank.

These and other objects and features of the invention will appear more fully from the accompanying description and drawings and will be particularly pointed out in the claims.

Figure 1:
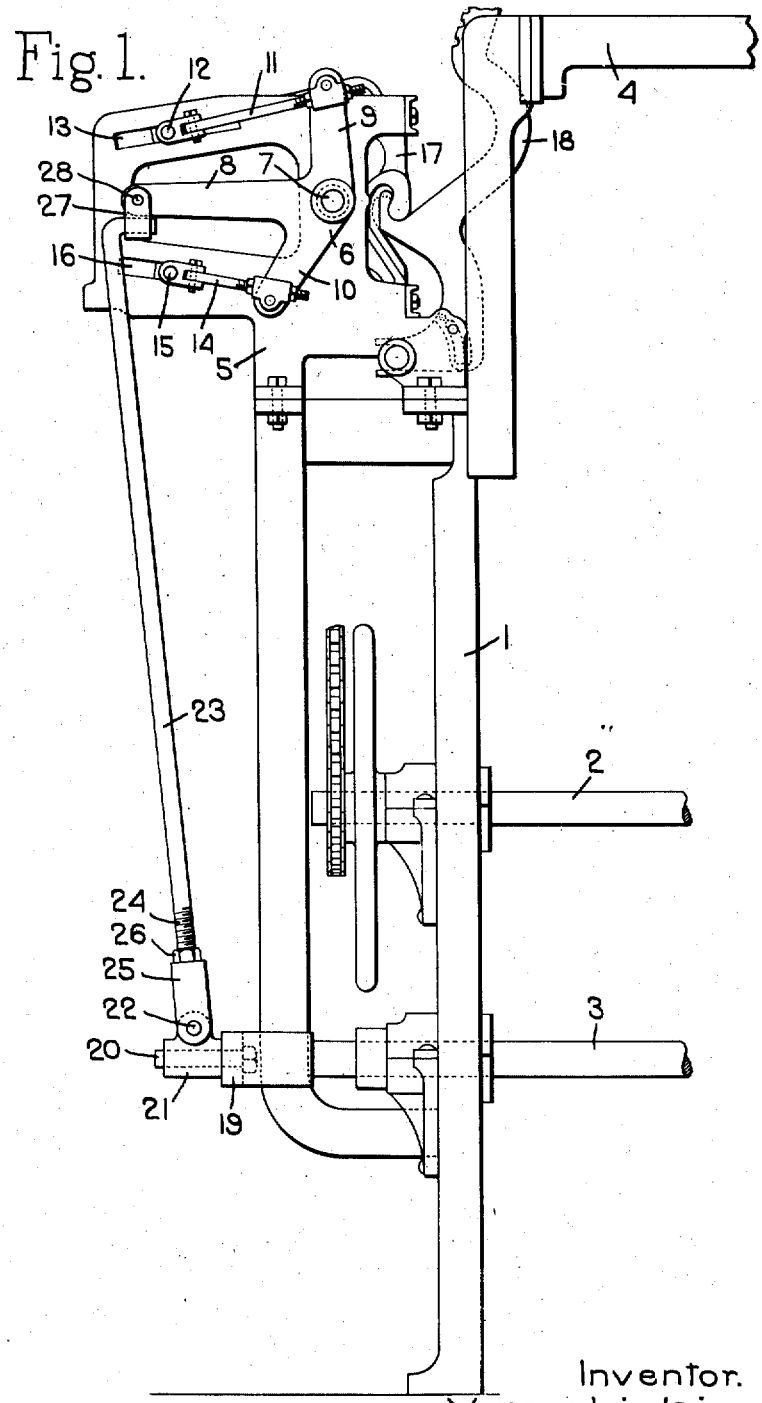
Fig. 1 is a front elevation of a portion of a loom and dobby mechanism, only those portions of one type of such mechanism being shown as are sufficient for a disclosure of the present invention.

A portion of a loom is shown comprising the side frame 1, the usual crank shaft 2 for operating the lay, the usual cam shaft 3 driven to have one revolution for each two revolutions of the crank shaft, and a portion of the usual loom arch 4.

A dobby mechanism is shown comprising the frame 5 secured to the loom frame and on which the operating elements of the dobby are mounted. As illustrated, the dobby comprises a pair of rocker levers 6, only one of which at the front of the frame being shown. These levers are secured to the transverse shaft 7 in the dobby frame. The rocker lever shown is of general T-shape comprising a central arm 8, while each rocker arm has an upwardly extending arm 9 and a downwardly extending arm 10. The arm 9 is pivotally connected to an adjustable link 11 and this link in turn is pivotally and universally connected to the end 12 of the usual dobby knife sliding in inclined slides 13 in the frame. Similarly the arm 10 is connected by the link 14 to the dobby knife 15 sliding in the inclined slot 16. This linkage construction is the same at both sides of the dobby. The dobby knives as usual selectively engage hooks, not shown, to rock the dobby levers 17 and in turn the harness frame jacks 18, which control the movement of the harness frames.

As this general type of dobby mechanism is well known and familiar to those skilled in the art, any further description thereof is unnecessary.

In the type of dobby mechanism with which this invention is concerned, the three-armed lever 6 is operated by a crank motion and for this purpose a crank arm 19 extends radially from the cam shaft 3 and has journalled thereon at 20 a sleeve 21 to which is pivotally connected at 22 one end of a two-part adjustable link 23, the adjustment being made by one part being threaded at 24 into the part 25 and secured in place by the lock nut 26. The other end of this link is pivoted in a socket member 27 in turn pivoted at 28 to the free end of the arm 8 of the lever 6. This connection constitutes in effect a link pivoted at 28 to the arm 8 of the lever 6 and at 20 to the crank on the cam shaft 3.

This crank mechanism for operating the dobby is a highly desirable type of mechanism for that purpose but it essentially involves a serious error in the movement of the harness frames. The harness frames should come to the same position each time the shed closes and the lay beats up in order that the filling may be beaten in under precisely the same conditions at all times. Consequently, each time the lay is at front center, the shed should be closed with all of the harness frames in their mid positions.

This means, of course, that the dobby knives, which are the primary actuating elements for moving the harness frames, should then be in such a mid position as to cause the jacks 18 to be in their mid position. But it will be recognized that while the crank pin 20 of the dobby operating crank is always at its uppermost and lowermost positions and consequently the dobby knives bring the jacks to their end positions of movement at the same periods in the cycle of loom operation, this is not true of the mid position. This is because in the crank motion the crank pin 20 moves through an arc of less than 90° from its top position to bring the upper end of the link 23 or the point 28 to its mid position of travel and through an arc of more than 90° to carry this point 28 to the lower end of its travel. This is simply a concomitant of a crank motion. This means that the dobby knives will not be in position to cause the jacks to be at their mid positions when the crank is at a position half-way between its uppermost and lowermost positions. Consequently the shed will not be quite closed when the lay beats up and the harness frames will, moreover, be in opposite positions for this slightly open shed at alternate beat-ups of the lay. This tends to produce unevenness in the weaving operation.

In the present invention the desirable crank motion for operating the dobby mechanism is retained but the construction is so altered as to cause the dobby knives to bring the jacks to their mid positions each time the crank pin is midway of its path of travel from its uppermost to its lowermost position. This brings the dobby mechanism in time with the period of the lay operation and secures the closing of the shed at the same point at each beat-up of the lay or the same period in the cycle of the loom operation.

Figure 2:
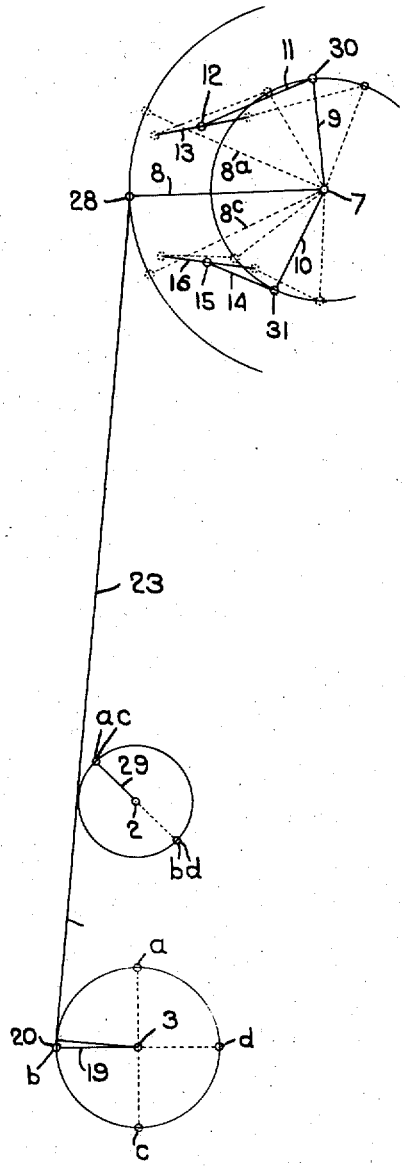
Figs. 2 and 3 are diagrams illustrating the principle involved in the invention.
Figure 3:
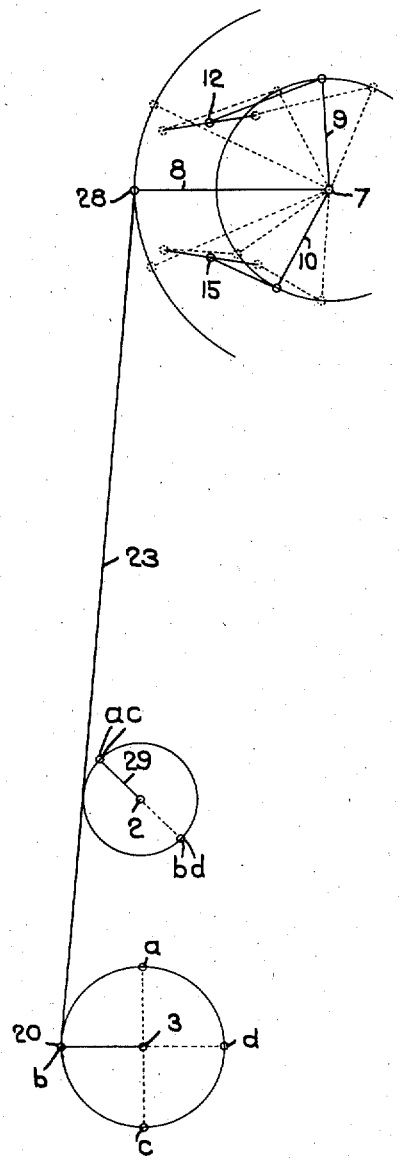

Two similar means for securing this result are illustrated diagrammatically in Figs. 2 and 3 of the drawings.

In Fig. 2 the elements of the mechanism are represented simply by lines and the various pivotal connections by points. Since it makes little difference whether the crank arm 19 is rotating in a plane transversely of the rocker arm 6 or in the plane thereof, it is shown for convenience in the latter position and the same is true of the crank shaft of the loom. I have, then, in Fig. 2 illustrated diagrammatically the crank shaft 2, the crank 29 for operating the lay, the cam shaft 3, crank arm 19, the crank pin 20, the link 23, the three-armed lever comprising the central arm 8 pivoted at 28 to the link 23, the upper arm 9 and the lower arm 10 with this three-armed lever pivoted at 7, the dobby knives 12 connected by the link 11 at 30 to the arm 6 and 15 connected by the link 14 at 31 to the arm 10.

In the present invention the angular relation of the knife-operating arms 9 and 10 with respect to the center arm 8 of the three-armed lever, the angular relation of the paths 13 and 16 of the knives which, it will be noted, is symmetrical with respect to the horizontal, the length of the paths of travel 13 and 16 of the knives required to move the jacks from one end position to the other, and the length of the knife-operating arms 9 and 10, are correlated so that when the crank pin 20 is at either of its positions *b*, *d* midway of its arc of travel between its extreme jack moving positions *a* and *c*, the knives 12 and 15 will be in such a position in their paths of travel 13 and 16 as to bring the jacks to their mid positions. This means that the arm 8 and the pivotal point 28 will be determined by moving the three-armed lever until the crank pin 20 is at the point *b* or *d*.

The extreme positions shown in dotted lines 8*a*, 8*c* are determined by the movement of the crank pin 20 to the points *a*, *c*. Hence it is only necessary so to construct the three-armed lever that the arm 9 and link 11 shall move the dobby knife 12 to the end positions required to bring the jacks to their end positions coincidentally with the movement of the arm 8 to the extreme limits of its travel and that the dobby knife 12 shall reach such a point in its path of travel as to bring the jacks to mid position when the arm 8 is in the position illustrated, that is, with the crank 20 at *b* or *d*. The same thing must be true of the arm 10 and the dobby knife 15. The simplest way to effect this construction is to lay it out graphically by the cut and try method. The angle between the positions 8*a* and 8*c* being fixed and the mid position of the jacks being fixed, it is only necessary to select lengths of arms 9 and 10 which, when swung through an angle equal to the angle between 8*a* and 8*c*, shall give the desired result. The shifting of these arms 9 and 10 into the required positions enables unequal angular movements thereof to give equal movements of travel of the dobby knives because unequal movements of the points 30 and 31 in their arcs of travel may be resolved into equal movements in the travel of the point 12 in the straight line path 13 and the point 15 in its straight line path 16. By thus correlating these elements, it is easy to construct a three-armed lever 9, 8, 10 as illustrated so that when the crank pin 20 is at the points *b* and *d*, the knives 12 and 15 will bring the jacks to their mid position and when the crank pin 20 is at the points *a* and *c*, the knives will be oppositely disposed with the jacks at their end positions.

A similar construction is shown in Fig. 3 and is obtained in a similar manner, the only difference being that in this case the arm 8 of the three-armed lever is shown in a horizontal position when the jacks are at their mid position. To secure this construction the link 23 is lengthened out slightly so that when the crank pin 20 is in position *b*, the pivotal point 28 is on a horizontal line extending through the pivot 7. The construction of the three-armed lever may then be arrived at graphically in the manner already described.

It will thus be seen that a three-armed lever may be readily constructed which without other changes in the construction of the dobby will enable the dobby mechanism to operate with perfect accuracy while still employing the crank motion so as to cause the shed to close in the same period in the cycle of the loom each time. For example, in Figs. 2 and 3 it is assumed that the lay is at back center at the point *a*, *c* and at front center at the point *b*, *d* and since the crank shaft 2 is revolving twice to each rotation of the cam shaft 3, it follows that the jacks will be at their mid positions each time the lay reaches front center and consequently the shed will be closed at the same period in the cycle of the loom at all times.

Having thus described the invention, what is claimed as new, and desired to be secured by Letters Patent, is:

1. A loom dobby comprising a pair of sliding harness frame jack-operating knives, a three-armed lever fulcrumed midway the planes of movement of the knives to swing in a plane transversely of the knives, a crank, a link connecting the crank and the center arm of the lever, and links connecting the other arms of the lever respectively to the knives, in which angular relation of the knife-operating arms to the center arm of the lever, the angular relation of the paths of the knives, the length of travel of the knives required to operate the jacks and the length of the knife-operating arms are correlated to cause the knives to bring the jacks to their mid positions when the crank is at either mid point of its arc of movement between its extreme jack-moving positions.

2. A loom dobby comprising a pair of sliding harness frame jack operating knives, a three-armed lever fulcrumed midway the planes of movement of the knives to swing in a plane transversely of the knives, a crank, a link connecting the crank and the center arm of the lever, and links connecting the other arms of the lever respectively to the knives, in which the angular relation of the knife-operating arms to the center arm of the lever, the angular relation of the paths of the knives, the length of the travel of the knives required to operate the jacks and the length of the knife-operating arms are correlated to cause the knives to bring the jacks to their mid positions when the crank is at either mid point of its arc of movement between its extreme jack-moving positions and to cause the knives to be oppositely disposed with the jacks at their end positions when the crank is at either of its extreme jack-moving positions.

3. In a loom, a dobby having a pair of sliding harness frame jack operating knives, a three-armed lever fulcrumed midway the planes of movement of the knives to swing in a plane transversely of the knives, a crank, a link connecting the crank and the center arm of the lever, links connecting the other arms of the lever respectively to the knives, and a lay operating crank shaft rotating twice to each rotation of the dobby crank in which the angular relation of the knife-operating arms to the center arm of the lever, the angular relation of the paths of the knives, the length of travel of the knives required to operate the jacks and the length of the knife-operating arms are correlated to cause the knives to bring the jacks to their mid positions when the lay operating crank shaft is at front center.

4. In a loom, a dobby having a pair of sliding harness frame jack-operating knives, a three-armed lever fulcrumed midway the planes of movement of the knives to swing in a plane transversely of the knives, a crank, a link connecting the crank and the center arm of the lever, links connecting the other arms of the lever respectively to the knives, and a lay operating crank shaft rotating twice to each rotation of the dobby crank in which the angular relation of the knife-operating arms to the center arm of the lever, the angular relation of the paths of the knives, the length of travel of the knives required to operate the jacks and the length of the knife-operating arms are correlated to cause the knives to bring the jacks to their mid positions when the lay operating crank shaft is at front center and to cause the knives to be oppositely disposed with the jacks at their end positions when the lay operating crank shaft is at back center.

5. A loom dobby having a pair of harness frame jack-operating knives sliding in planes symmetrically, oppositely and angularly disposed with respect to a central horizontal path, a three-armed lever fulcrumed on an axis in the central plane to swing transversely of the knives, a crank having its axis of rotation parallel to the said central plane, a link connecting the crank and the central arm of the lever and links connecting the other arms of the lever respectively to the knives, in which the angular relation of the knife-operating arms to the center arm of the lever, the angular relation of the operating planes of the knives to the central plane, the length of travel of the knives required to operate the jacks, the length of the knife-operating arms, and the length of the link connecting the crank to the center arm of the lever are correlated to cause the knives to bring the jacks to their mid positions when the center arm of the lever is in the said central plane and when the crank is at either mid point of its arc of movement between its extreme jack-moving positions.

6. A loom dobby having a pair of harness frame jack-operating knives sliding in planes symmetrically, oppositely and angularly disposed with respect to a central horizontal path, a three-armed lever fulcrumed on an axis in the central plane to swing transversely of the knives, a crank having its axis of rotation parallel to the said central plane, a link connecting the crank and the central arm of the lever and links connecting the other arms of the lever respectively to the knives, in which the angular relation of the knife-operating arms to the center arm of the lever, the angular relation of the operating planes of the knives to the central plane, the length of travel of the knives required to operate the jacks the length of the knife-operating arms, and the length of the link connecting the crank to the center arm of the lever are correlated to cause the knives to bring the jacks to their mid positions when the center arm of the lever is in the said central plane and when the crank is at either mid point of its arc of movement between its extreme jack-moving positions and to cause the knives to be oppositely disposed with the jacks at their end positions when the crank is at either of its extreme jack-moving positions.

VERNER LINDSJO.